US008321842B2

(12) United States Patent
Xu et al.

(10) Patent No.: US 8,321,842 B2
(45) Date of Patent: Nov. 27, 2012

(54) REPLAY TIME ONLY FUNCTIONALITIES IN A VIRTUAL MACHINE

(75) Inventors: Min Xu, Palo Alto, CA (US); Dmitry Grinberg, Mountain View, CA (US); Vyacheslav Malyugin, Los Gatos, CA (US); Petr Vandrovec, Mountain View, CA (US); Ganesh Venkitachalam, Mountain View, CA (US); Boris Weissman, Mountain View, CA (US); Andrew Biggadike, Palo Alto, CA (US); James Chow, San Jose, CA (US)

(73) Assignee: VMware, Inc., Palo Alto, CA (US)

( * ) Notice: Subject to any disclaimer, the term of this patent is extended or adjusted under 35 U.S.C. 154(b) by 1096 days.

(21) Appl. No.: 12/163,513

(22) Filed: Jun. 27, 2008

(65) Prior Publication Data
US 2009/0327574 A1  Dec. 31, 2009

(51) Int. Cl.
*G06F 9/44* (2006.01)
*G06F 9/455* (2006.01)
(52) U.S. Cl. .............................. 717/127; 717/124; 718/1
(58) Field of Classification Search .................. 717/100, 717/124–135; 718/1
See application file for complete search history.

(56) References Cited

U.S. PATENT DOCUMENTS

| | | | | |
|---|---|---|---|---|
| 6,101,524 A * | 8/2000 | Choi et al. | ..................... | 718/102 |
| 6,795,966 B1 * | 9/2004 | Lim et al. | ........................... | 718/1 |
| 6,832,367 B1 * | 12/2004 | Choi et al. | ..................... | 717/130 |
| 6,854,108 B1 * | 2/2005 | Choi | ............................. | 717/125 |
| 7,380,049 B2 * | 5/2008 | Rajagopal et al. | ................ | 711/6 |
| 7,844,954 B2 * | 11/2010 | Venkitachalam et al. | .... | 717/130 |
| 7,945,908 B1 * | 5/2011 | Waldspurger et al. | ........... | 718/1 |
| 2004/0040013 A1 * | 2/2004 | Kalra | ............................ | 717/129 |
| 2007/0055837 A1 * | 3/2007 | Rajagopal et al. | ........... | 711/163 |
| 2008/0022032 A1 * | 1/2008 | Nicholas et al. | .............. | 711/100 |
| 2008/0244535 A1 * | 10/2008 | Nelson et al. | ................. | 717/129 |
| 2009/0119493 A1 * | 5/2009 | Venkitachalam et al. | .... | 712/238 |

OTHER PUBLICATIONS

Reekie, John, "How to use assertions in C," Dec. 1995, p. 1-4.*
Dunlap et al., "ReVirt: Enabling Intrusion Analysis through Virtual-Machine Logging and Replay," Dec. 2002, USENIX Association, p. 211-224.*
King et al., "Debugging operating systems with time-traveling virtual machines," Apr. 2005, USENIX Association.*
Amsden et al., "VMI: An Interface for Paravirtualization," Jul. 2006, Proceedings of the Linux Symposium, p. 371-386.*
"The Amazing VM Record/Replay Feature in VMware Workstation 6," Apr. 2007, [http://communities.vmware.com/community/vmtn/cto/steve/blog/2007/04/18/the-amazing-vm-recordreplay-feature-in-vmware-workstation-6], p. 1-3.*
Xu et al., "ReTrace: Collecting Execution Trace with Virtual Machine Deterministic Replay," Jun. 2007, VMware Inc.*

* cited by examiner

*Primary Examiner* — Wei Zhen
*Assistant Examiner* — Qing Chen (57) ABSTRACT

Replay-time-only functionalities in a computer program are executed only during replay in a virtual machine and are skipped outside of replay. If a replay-time-only functionality is detected during the replay of a program execution in a virtual machine, the replay may be paused and the virtual machine state may be saved. The replay-time-only core functionality is executed. When this execution is complete, a prior state of the virtual machine may be restored and the replay may be resumed.

59 Claims, 4 Drawing Sheets

FIGURE 1

PRIOR ART

REPLAY TIME ONLY FUNCTIONALITIES IN A VIRTUAL MACHINE

FIELD OF THE INVENTION

This invention relates to executing computer programs, and, in particular, to executing computer programs in a virtualized computer environment.

BACKGROUND OF THE INVENTION

Figure 1:
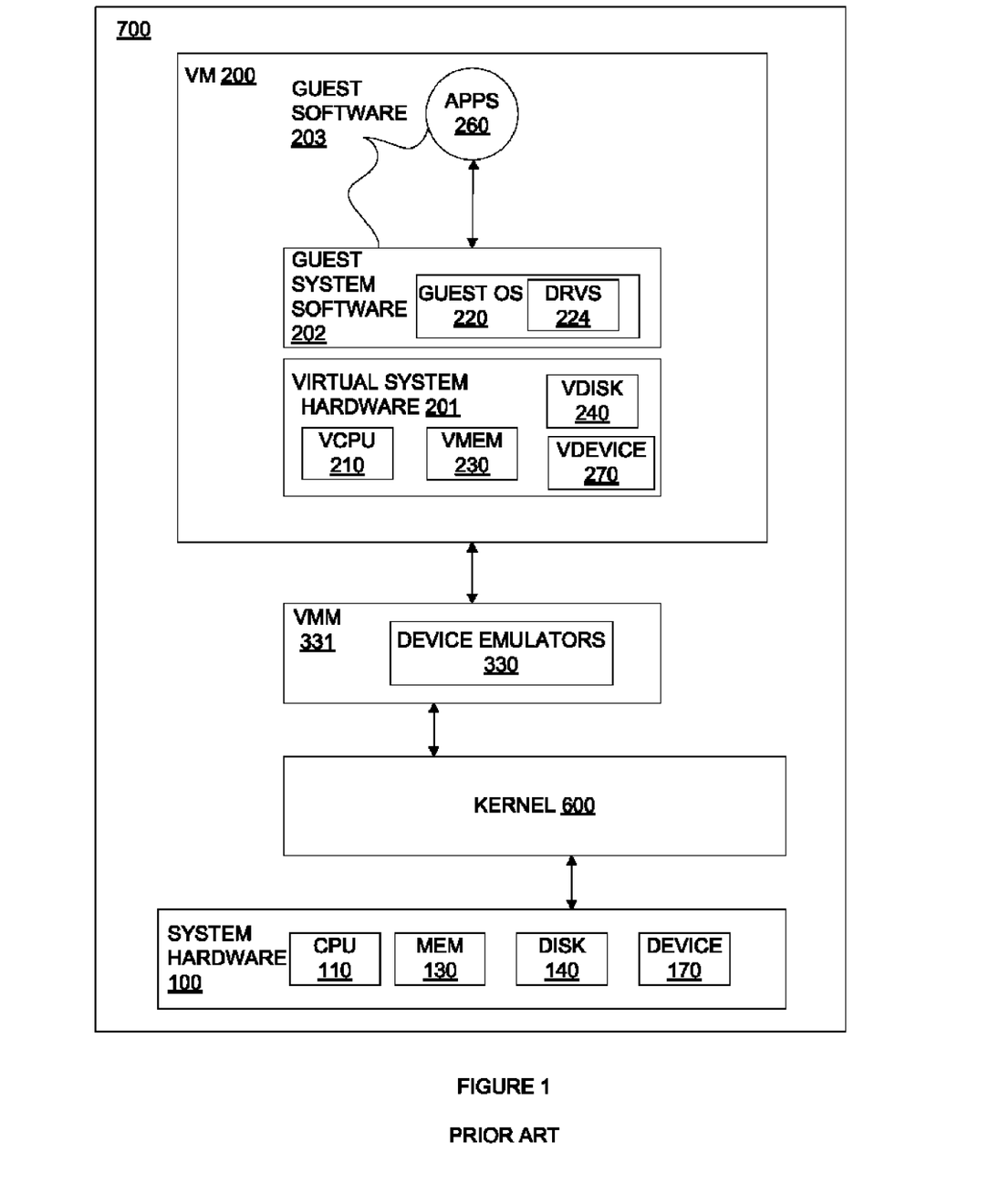
FIG. 1 shows a virtualized computer system in which this invention may be implemented.

A virtual machine ("VM") is an abstraction (a "virtualization") of a physical computer system. FIG. 1 shows an example of a virtualized computer system 700. A virtual machine 200 is installed on a host platform that includes system hardware 100. System hardware 100 includes one or more Central Processing Units (CPUs) 110, memory 130 (such as RAM (random access memory)), one or more hard disks 140 and various devices 170, such as Network Interface Cards (NICs), a keyboard, a display, etc.

VM 200 includes virtual system hardware 201 and guest software 203. Virtual system hardware includes one or more virtual CPUs 210, virtual memory 230, one or more virtual hard disks 240 and one or more virtual devices 270. Guest software 203 includes guest system software 202 and guest applications 260. Guest system software 202 includes a guest operating system ("guest OS") 220 with drivers 224 for virtual devices 270. Virtual system hardware 201 is a virtualization of the underlying system hardware 100. In some virtualized computer systems, the virtual system hardware may have the same general architecture as the underlying physical system hardware, while, in other virtualized computer systems, the virtual system hardware may be a different hardware architecture from that of the physical system hardware. That is, the virtual hardware interface and resources visible to the guest system software 202 are mapped by the virtualization software onto the interface and resources of the system hardware 100. In some implementations, this mapping is invisible to the guest system software 202.

In implementations where the mapping is invisible to guest system software 202, guest system software 202 generally interfaces with virtual system hardware 201 in the same way as it would interface with actual system hardware on a non-virtualized machine. For example, guest OS 220 interfaces with virtual disk 240 and/or virtual memory 230 to access an executable guest application file. These interactions are transparently mapped by virtualization software to actual system hardware 100 that can provide the requested resources.

Virtualization software can include a Virtual Machine Monitor (VMM) 331 and a virtualization kernel 600. As used herein, the term "hypervisor" can refer to the VMM 331 alone, or the VMM 331 and the kernel 600 together. Device emulators 330 emulate the virtual system hardware components that are shown as part of VM 200.

Virtual machines can be configured as "fully virtualized," in which no software components are included in the guest software 203 other than those that would be found in a non-virtualized computer. For example, the guest OS 220 could be a commercial, off-the-shelf OS with no components designed specifically to support a virtualized environment.

"Para-virtualized" machines can include guest software 203 that is configured in some way to provide features that facilitate virtualization. For example, a guest OS 220 that is specifically designed to avoid certain privileged instructions and certain memory address ranges can be part of a para-virtualized machine. In another example of para-virtualization, a driver may be loaded into the guest OS 220 that is designed to communicate with other virtualization components.

A virtualized computer system may be referred to as a "hosted" system when the virtualization software relies on system software that is separate from the virtualization software for certain functionality, such as for performing certain Input/Output (I/O) operations. For example, the virtualization software may rely on a separate, conventional host OS, installed directly on the system hardware, for providing such functionality. An example of a hosted virtualized computer system is the Workstation virtualization product made by VMware, Inc. of Palo Alto, Calif.

A "Non-Hosted" virtualized computer system is one in which the virtualization software does not rely on separate system software to provide such functionality. Instead, such functionality is implemented in the virtualization software itself. The virtualized computer system of FIG. 1 is a non-hosted virtualized computer system. In the system of FIG. 1, the VMM 331 may be tightly coupled with, or even part of, the kernel 600, which may be designed specifically to provide efficient support for executing VMs. An example of a non-hosted virtualized computer system is the ESX server virtualization product made by VMware, Inc of Palo Alto, Calif.

A virtual machine environment provides a convenient platform for the recording (logging) and replay of execution. Recording and replaying a virtual machine execution can be useful for debugging by allowing a developer to step through a recorded execution while reviewing the guest software state at each step to identify the cause of an error. For example, on replay, the developer can look at memory, set breakpoints, and single step through the execution to identify problems and resolve them.

Deterministic replay in a virtual machine creates an execution that is logically equivalent to an original execution of interest. Two executions are logically equivalent if they contain the same set of dynamic instructions, each dynamic instruction computes the same result in the two executions, and the two executions compute the same final state of the system (CPU, memory and devices). A deterministic replayer can be based on VMware's virtual machine monitor, which is a thin layer of software that sits between hardware and a guest OS to provide a virtualized IA-32 Instruction Set Architecture. Such a replayer supports full-system replay, that is, all data necessary for the execution of the entire virtual machine (VM), including a guest OS and guest applications, is recorded and replayed. During recording, all sources of non-determinism from outside the virtual machine are captured and recorded in a log file. These include data and timing of inputs from all devices, including virtual disks, virtual network interface cards (NIC), etc. A combination of techniques, such as device emulation and binary translation, are used to ensure deterministic replay as long as the recorded device input data are sent to guest software 203 at the right times.

It is known to use program checking tools in non-virtualized environments to facilitate the development of a software application. Print statements and software assertions can be included in an application's program source code that can help to test and assure otherwise unstated assumptions within the program. For example, the traditional assert( ) statement is a preprocessor macro defined by including assert.h in a C program. If the expression it contains evaluates false, assert( ) writes the expression, source filename and line number to standard error, then calls abort( ) to end the process and possibly create a memory image. If disabled by defining NDEBUG at compile time, assert( ) has no effect.

However, such assertions can disadvantageously introduce "probe effects" into the development process. When the application is executed, with assertions enabled, system resources are absorbed by the execution of the assertions themselves, which can throw off critical timing relationships in the application. This can introduce new bugs into the program, cause other bugs to be missed and mask still other errors. Once debugged, assertions are often removed from the application program. This again changes the application behavior and, even worse, makes the application much more difficult to debug because the automatic error detection provided by assertions are no longer available.

SUMMARY OF THE INVENTION

An embodiment of the present invention can determine if an instruction or set of instructions (a "functionality") in a replayed program is to be executed during replay mode only. If so, then the replay of the program can be paused and the virtual machine replay state can be saved. The replay-time-only functionality is then executed. When the replay-time-only functionality has completed, the replay state of the virtual machine can be restored and the execution of the replayed program can be resumed. When the program containing the replay-time-only functionality is being executed outside of replay mode, then the replay-time-only functionality is skipped, or otherwise not executed.

DETAILED DESCRIPTION

Embodiments of this invention provide a framework for high performance, low probe-effect program checking. Virtual machine record and replay technology is leveraged with features such as virtual machine-based watchpoints and breakpoints to provide efficient error-checking and debugging for application developers. Although the ensuing description illustrates some embodiments of the present invention by discussing virtual assertions, those of skill in the art will appreciate that the present invention encompasses the use of any single-entry, multiple-exits block or blocks of code. Such blocks of code can be comprised of a single instruction or multiple instructions. As used herein, the term "functionality" means such a block of code and a "virtual assertion" is an example, without limitation, of a "replay-time-only functionality."

In accordance with embodiments of the present invention, the developer can include virtual assertions in source code as he would traditional assertions, but compiles his code using a virtual assertion Software Development Kit ("SDK"). The resulting program binary contains "virtual assert" code, which is based upon the included virtual assertions and which is not executed unless the program is being replayed. When the virtual assert binary is executed outside of replay, (e.g., by application users on a non-virtual machine, by the developer while recording the execution on a virtual machine, etc.), the virtual assert code is not executed. During replay, the virtual assert code is activated while the behavior of the recorded execution may be substantially or exactly reproduced. The overhead for executing the virtual assertions is incurred only during replay. In this way, the use of virtual assertion code in accordance with embodiments of the present invention provides low probe-effect program checking.

In accordance with embodiments of the present invention, a virtual assertion can be detected in the binary of an application during a replay of an earlier-recorded execution. The replay is then paused and the VM state is saved to protected memory. When the execution of the replay-time-only functionality is complete, the state of the VM can be restored to the saved (or an earlier) state and the replay can be resumed. Alternatively, the user can be given the option of going live during the execution of the virtual assertion.

In accordance with various embodiments of the present invention, data that is saved to protected memory during the execution of a virtual assertion (or, more generally, during any replay-time-only functionality) can be made available to other replay-time-only functionalities. For example, data that is saved from the execution of a first replay-time-only functionality can be made accessible to a subsequent execution of the same functionality and/or to a subsequent execution of a distinct, second replay-time-only functionality. In an embodiment of the present invention, when a first replay-time-only functionality is encountered, a first replay state is saved and execution of the VM is paused. The first replay-time-only functionality can then write the present value of a variable into protected memory, for example. The VM can then be restored to its first replay state and replay can be resumed until a second replay-time-only functionality is encountered. A second replay state can be saved, replay can be paused and the second replay-time-only functionality can be executed. When the second replay-time-only functionality has finished executing, the VM can be restored to its second replay state. In accordance with embodiments of the present invention, the second replay-time-only functionality can access the data written to protected memory by the first replay-time-only functionality. The second replay-time-only functionality can be a subsequent execution of, for example, the first assertion, or else a second assertion distinct from the first. The second replay-time-only functionality can use the data written by the first replay-time-only functionality in a wide variety of ways. For example, the second replay-time-only functionality can compare or combine in any suitable way the data written by the first replay-time-only functionality with the present value or values of the same or different variables.

The type(s) and amount of data that are saved to protected memory can also vary greatly in different embodiments or different situations. For example, larger amounts of data can be saved to protected memory in the form of sets, buffers, arrays or various other data structures. For example, a user can save a set of valid pointer values using replay_time_only_set_add( ), which is a virtual assertion that is analogous to the existing assertion set_add( ). Later, he can check if a new pointer value is one of the valid pointers by using replay_time_only_set_contain( ), which is a virtual assertion that is analogous to the existing assertion set_contain( ). Overhead for maintaining and checking against the set of valid pointers occurs only during replay.

A replay-time-only functionality can be identified by the hypervisor in any suitable way. For example, a replay-time-only functionality can include, or be compiled to include, an initial instruction to fetch the value of a variable. The variable can be established and its value can be initialized (e.g., value=0) when the application is initialized during normal (non-replay) execution. The replay-time-only functionality can include code that causes the rest of the instructions in the replay-time-only functionality to be skipped when the value returned is equal to a predetermined value. For example, the replay-time-only functionality can implement, "if value=0, then jump to the next instruction after the end of the replay-time-only functionality." In this way, the replay-time-only functionality can be skipped during normal execution. When replay is initialized, the variable can be changed to a different value (e.g., value=1) and the memory page containing the variable can be protected to ensure that the variable cannot be modified again by guest software. Using the memory page protection, the hypervisor can watch for a read of the variable during replay. When the replay-time-only functionality first attempts to read the value, the hypervisor can pause the replay, save the replay state and then cause the rest of the instructions to be executed. For example, the replay-time-only functionality can implement, "if value=1, then execute the next instruction of the replay-time-only functionality." This causes the replay-time-only functionality to be executed during replay.

In accordance with other embodiments of the present invention, the replay-time-only functionality can include, or be compiled to include, a special pattern of code that indicates a replay-time-only functionality that should be skipped outside of replay mode. In one embodiment, such code can include:

```
jmp next
next:
jmp skip_replay_time_only_assertion
hypercall(save_replay_state)
if (!(expr)) {
//assert failed
hypercall(go_live)
abort( );
}
hypercall(restore_replay_state)
skip_replay_time_only_assertion:
```

The non-replay execution of this code will skip the replay-time-only functionality. During replay mode, the hypervisor can recognize the pattern:

```
jmp next
next:
```

(or any other suitable pattern) as indicating the beginning of a replay-time-only functionality. In one embodiment, for example, the hypervisor uses only binary translation during replay mode and does not use direct execution at all during replay. As the hypervisor is translating guest code, when it encounters the above pattern, it generates a translation that, during replay mode, skips the instruction     jmp skip_replay_time_only_assertion to execute the ensuing replay-time-only instructions, starting with     hypercall(save_replay_state)

Any suitable pattern may be used to skip the functionality in non-replay mode that can be recognized in replay mode and trigger the execution of the ensuing instructions.

After the starting pattern of a replay-time-only functionality is recognized and the replay-time-only functionality begins to execute, the functionality can issue hypercalls to the hypervisor to indicate that the replay state is to be saved or restored, or that replay should be stopped because an assertion failed. The hypervisor can temporarily stop the replay software engine so that the replay software engine does not try to send recorded data to guest software 203. The hypervisor can also set up page protection on guest memory and, using well known copy-on-write techniques, the hypervisor can save away the original content if the guest memory is changed during the execution of a replay-time-only functionality. In this way, memory side effects of replay-time-only functionality execution can be reverted when the execution of the functionality has been completed. Of course, as described above, some of the results of functionality execution can be stored away in protected memory to be preserved for later use. Such persistent state information can be saved outside of the VM by the hypervisor (i.e. in memory page(s) that are protected from access by guest software), thereby preventing any impact on deterministic replay.

The code in a replay-time-only functionality can be further broken down based on the purpose that it serves within the functionality. The functionality code indicated above, beginning with "jmp next" and ending with "skip_replay_time_only_assertion:" will be used as an example. First, the code that implements the primary functionality of the replay-time-only functionality may be referred to as the "core functionality code" or the "replay-time-only core functionality." In the example functionality code, the core functionality code consists of the following:

```
if (!(expr)) {
//assert failed
hypercall(go_live)
abort( );
}
```

Second, there may be some code that is executed only during replay mode, but which does not constitute core functionality code. In the example functionality code, the "hypercall (save_replay_state)" and "hypercall(restore_replay_state)" instructions are only executed during replay mode, but they do not constitute core functionality code. Instead, these two hypercall instructions respectively save and restore the replay state to ensure that the replay-time-only functionality does not affect deterministic replay. Such code that is only executed during replay mode, but which does not constitute core functionality code, may be referred to as "support code" or "replay support code." Third, there may be some code that causes or triggers the core functionality code and the replay support code (if any) to be executed during replay mode, but not to be executed during non-replay mode. Such code may be referred to as "replay-time-only enabling code." In the functionality example, the following code constitutes replay-time-only enabling code:

```
jmp next
next:
jmp skip_replay_time_only_assertion
...
skip_replay_time_only_assertion:
```

Other embodiments of this invention, however, may not involve the use of replay-time-only enabling code. For example, if some of the functionality for this invention is implemented in hardware, then there may be no need for code (i.e. object code instructions) for causing the replay-time-only functionality to be executed only during replay mode. For example, one or more bits in an instruction, in a register, in memory, etc. may be used to indicate replay-time-only functionality, and one or more bits in a register, in memory, etc. may be used to indicate that a VM is being executed in replay mode. These bits may be used to trigger the execution of the replay-time-only functionality during replay mode, and not during non-replay mode. Thus, instead of using the phrase replay-time-only enabling "code," a phrase such as "replay-time-only enabling mechanism" may be used to encompass other implementations in which replay-time-only functionality is caused to be executed during replay mode, without the use of replay-time-only enabling code.

A combination of page protection and binary translation techniques can be used by the hypervisor to implement watchpoint functionality during replay. First, watchpoint functionality can be completely implemented using page protection. The memory page containing a variable on which a watchpoint is set may be protected. Then, when there is an access to that memory page, the hypervisor can determine whether the access was actually to the variable of interest and whether the conditions for triggering the watchpoint are satisfied. Various binary translation techniques can be used to make the watchpoint functionality more efficient. For example, suppose that a memory page containing a first variable on which a watchpoint is set also contains a second variable that is accessed frequently. The memory protection will be triggered each time the second variable is accessed, only to find out that the conditions for the watchpoint are not satisfied. This situation can be avoided or mollified, for example, by using binary translation to move the second variable to another memory page that is not protected.

Examples of possible replay-time-only functionalities include the following, without limitation, each of which is analogous to a corresponding existing functionality:

```
replay_time_only_assertion:
    void writeArray(array, index, value) {
        replay_time_only_assertion(index < array.length);
    }
replay_time_only_logging:
    void compute(value) {
        replay_time_only_logging(1, // log level
            "value = %d\n", value);
    }
replay_time_only_watchpoint:
    void callback(Addr, size) {
        replay_time_only_assertion(*(int*)addr > 0);
    }
    void main( ) {
        replay_time_only_watchpoint(addr, size,
            read_or_write, &callback);
    }
```

Another possible replay-time-only functionality, replay_time_only_set_contain, may be used for replay-time persistent state management. Also, a replay_time_only_logging (expr) functionality may be used for a printf-like statement, which doesn't affect deterministic replay. These virtual assertion-type replay-time-only functionalities are executed only during replay. For example, replay_time_only_watchpoint sets up a watchpoint callback that can be called only during replay.

Other examples of possible replay-time-only functionalities include virtual assertions that correspond to their traditional assertion counterparts, as known in the art. These can include, without limitation:

```
replay_time_only_save
replay_time_only_retrieve
replay_time_only_set_add
replay_time_only_set_del
```

Embodiments of the present invention can be implemented, for example, using hypervisor support and a guest compiler. In some embodiments, the guest compiler can produce replay-time-only functionality code that does not affect non-replay execution, such as by using the techniques described above. During replay, the hypervisor can recognize the beginning of replay-time-only functionality code and cause it to execute, rather than skipping over it. It can execute such code without affecting deterministic replay, e.g., it can hide the effects of the execution of the replay-time-only functionalities. Further, the hypervisor can support persistent state information across executions of multiple replay-time-only functionalities, as described above.

Figure 2:
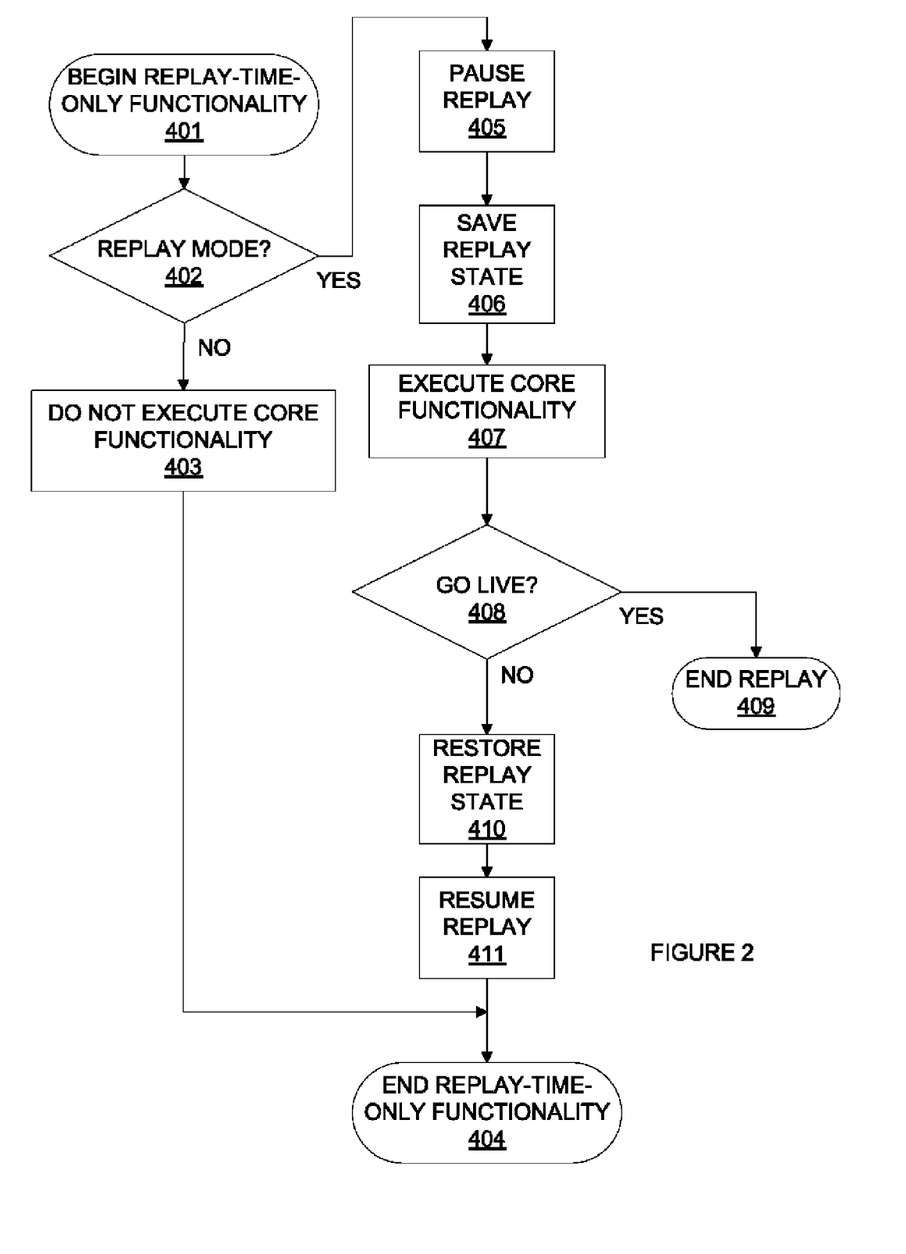
FIG. 2 is a flow chart showing a general method in accordance with some embodiments of the invention.

FIG. 2 is a flow chart illustrating a general method that may be performed in some embodiments of the invention, upon encountering a replay-time-only functionality during the execution of a VM. The method of FIG. 2 may be implemented through the interaction of multiple software entities. For example, some steps of the method of FIG. 2 may be performed by the hypervisor in a virtualized computer system, while other steps may be performed by guest software. When a replay-time-only functionality is encountered, 401, during the execution of a VM, a determination is first made as to whether the VM is in replay mode, 402. This determination may be made by various means, including those described herein. If a determination is made that the VM is not in replay mode, then the replay-time-only core functionality is not executed, 403, such as by skipping the instructions that implement the core functionality. The method of FIG. 2 for handling a replay-time-only functionality during the execution of a VM terminates at step 404.

If, at step 402, a determination is made that the VM is in replay mode, the replay of the execution of the VM is paused, 405. For example, values are not read from a replay log while replay is paused. Next, the state of the VM is saved, 406, and the replay-time-only core functionality is executed, 407. Next, at step 408, a determination is made as to whether the VM should "go live," terminating the replay mode, and returning to normal operation. This determination may be made based on various circumstances, such as a variable having a value that does not match an expected value in a virtual assertion, or a user selecting to go live in response to a replay-time-only core functionality. If a determination is made to go live, the replay mode is terminated and the method of FIG. 2 ends at step 409. If a determination is made that the VM should not go live, then the state of the VM is restored, 410, such as to the same state that was saved at step 406. Next, replay of the VM is resumed, 411, so that values are again read from the replay log, and the method of FIG. 2 for handling a replay-time-only functionality terminates at step 404.

In some embodiments of the invention, many of the steps of FIG. 2 can be removed from the method, or they can be performed selectively, without departing from the teachings of this invention. Specifically, steps 405, 406, 408, 409, 410 and 411 may be removed from the method entirely, or they may be performed selectively, based on the implementation and/or the circumstances. For example, instead of pausing replay of an active VM and saving the state of the active VM, and later restoring the state of the active VM and resuming replay, the active VM may be forked to create a separate VM, which can then be used to execute the replay-time-only functionality without affecting deterministic replay of the original VM. As another example, if the replay-time-only functionality consists of simply saving the current value of a variable to protected memory, then the step of determining whether to go live, 408, can be skipped.

Figure 3:
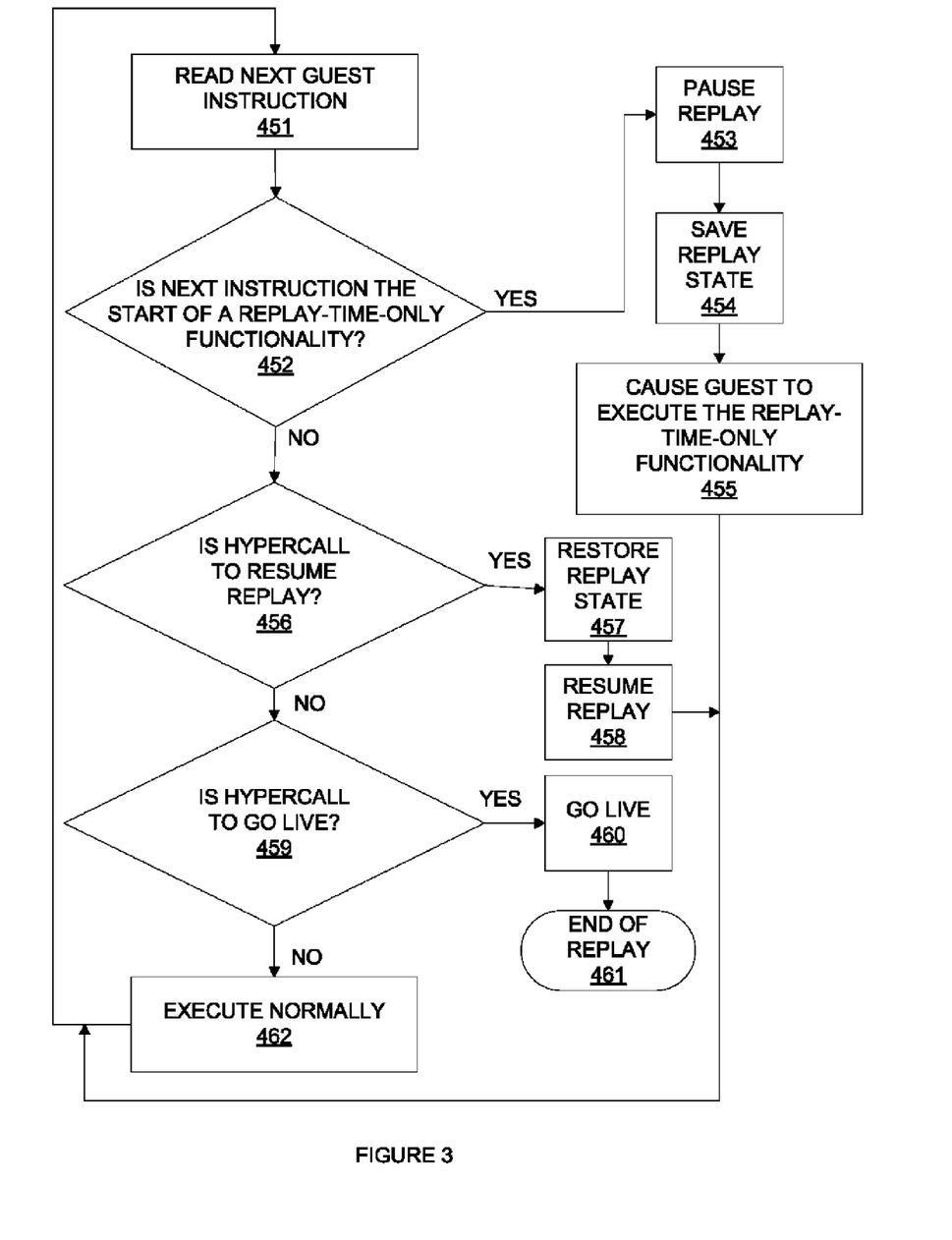
FIG. 3 shows a method performed by virtualization software during replay mode in accordance with an embodiment of the invention.

As described above, the method of FIG. 2 may be implemented through the interaction of multiple software entities, such as the hypervisor and guest software in a virtualized computer system. FIG. 3 shows a method that is performed by a hypervisor of a virtualized computer system, when executing a VM in replay mode, in accordance with an embodiment of the present invention. More specifically, when the hypervisor is executing the VM in replay mode and a fault occurs, the hypervisor is activated, and the hypervisor performs the method of FIG. 3, along with other possible actions. First, upon activation after a fault, the hypervisor reads the next guest instruction that is to be executed in replay mode, 451. The hypervisor determines if this next instruction is the start of a replay-time-only functionality, 452. If it is, replay is paused, 453, and the state of the virtual machine is saved, 454. Next, the hypervisor takes some action that will cause the guest software to execute the replay-time-only core functionality, 455, after which the process starts again on the next guest instruction, as shown. If the next instruction is not a replay-time-only functionality, then the hypervisor determines if there is a hypercall to resume replay, 456. If there is, then the state of the virtual machine is restored, 457, to a state at or prior to the time at which the virtual machine state was saved at step 454. In some embodiments, the developer can "walk" the machine state back to a point at or prior to such a time before resuming replay, or otherwise select some prior operating point to be restored. After the virtual machine state has been restored, replay is resumed, 458, and the process starts again on the next guest instruction. If there is no hypercall to resume replay, then the hypervisor determines if there is a hypercall to go live, 459. If there is, then the hypervisor goes live, 460, e.g., to terminate the replay mode, 461, and allow a user to interact with the VM that was previously being replayed. If not, then the instruction is executed normally, 462, i.e., as a normal guest instruction.

Figure 4:
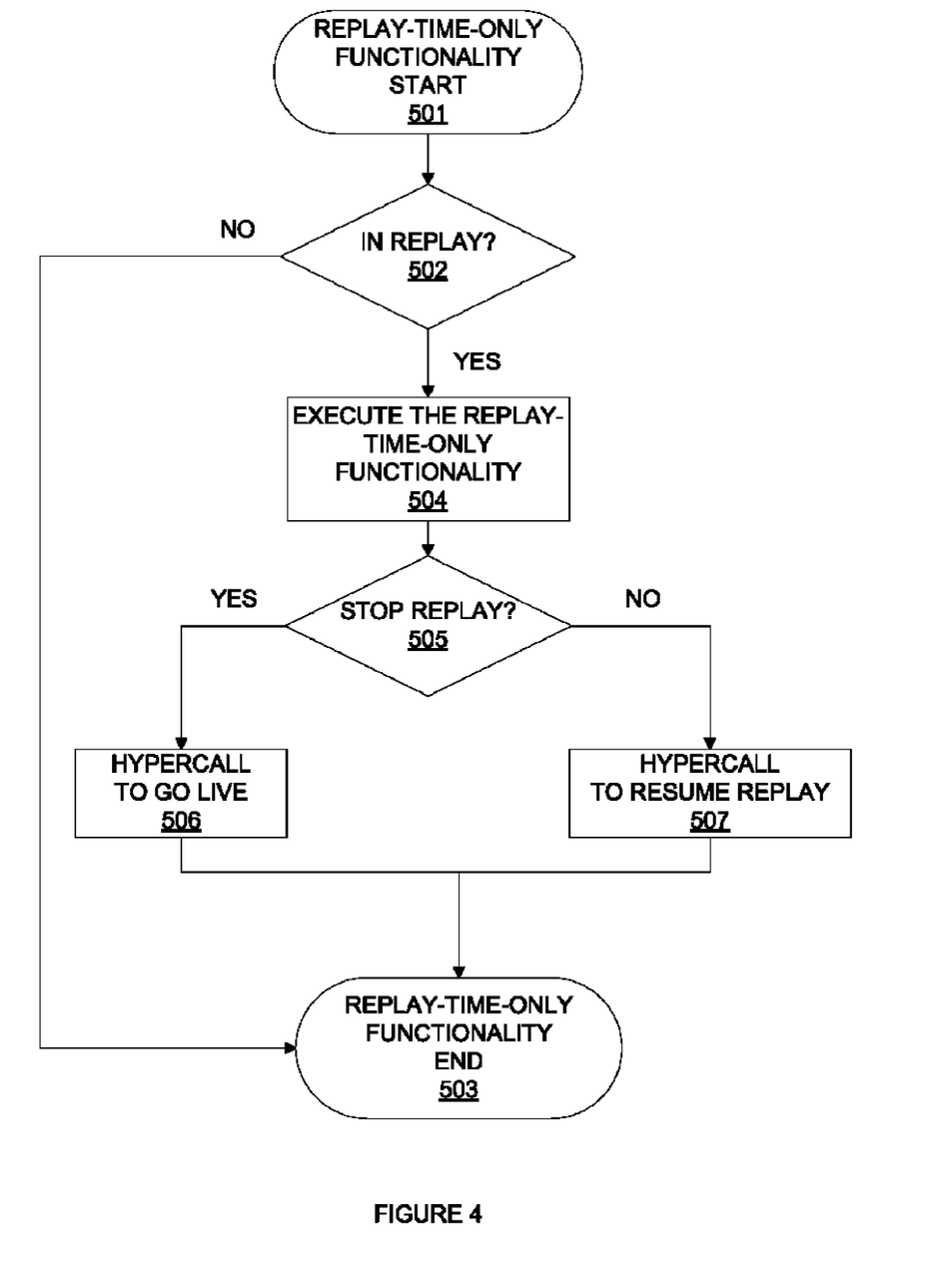
FIG. 4 shows a method performed by guest software upon encountering replay-time-only functionality in accordance with an embodiment of the invention.

FIG. 4 shows a method that may be performed by guest software in a virtualized computer system, in accordance with the same embodiment of the invention as for FIG. 3. FIG. 4 illustrates a corresponding, complimentary method to the method of FIG. 3. While the hypervisor is performing the method of FIG. 3, the guest software may be performing the method of FIG. 4. When guest software encounters a replay-time-only functionality, 501, the guest determines if the virtual machine is in replay mode, 502. If not, then the guest skips to the end of the replay-time-only functionality instructions, 503. If it is, then the one or more instructions of the replay-time-only core functionality are executed, 504. Next, based on the execution of the core functionality code, a determination is made as to whether replay should stop, 505. If a determination is made that replay should stop, the guest can issue a hypercall to go live, 506. Otherwise, a hypercall can be issued to resume replay, 507. After either step 506 or step 507, the method of FIG. 4 for handling the replay-time-only functionality terminates at step 503.

Operation of an embodiment of the invention will now be described with reference to the methods of FIGS. 3 and 4. In this embodiment, as described above, a replay-time-only functionality is initiated in guest software within a VM by fetching the value of a "replay" variable. When the guest software is initialized, the replay variable is established and initialized with a value of zero, for example. If fetching the replay variable returns a value of zero, indicating that the VM in which the guest software is running is not in replay mode, then the guest software skips the replay-time-only core functionality and moves on to instructions following the replay-time-only functionality. If the VM is in replay mode, then the hypervisor is activated upon a fetch of the replay variable, and the hypervisor ensures that the fetch returns a value of one for the replay variable. In this event, the guest software executes the replay-time-only core functionality. The hypervisor can use page protection to protect the memory page containing the replay variable, and then the hypervisor can set the replay variable to zero when the VM is not in replay mode and the hypervisor can set the replay variable to one when the VM is in replay mode.

Now, referring to FIG. 4, the guest software encounters an instruction to fetch the replay variable, 501, which will be used to determine if the VM is in replay mode, 502. If the VM is not in replay mode, the hypervisor is not activated, the fetch of the replay variable returns a value of zero, a determination is made that the VM is not in replay mode, 502, the replay-time-only core functionality is skipped, and the relay-time-only functionality ends, 503. If, on the other hand, the VM is in replay mode, the fetch of the replay variable causes a fault due to page protection (which page protection is set up by the hypervisor when the VM goes into replay mode) and the hypervisor is activated to perform the method of FIG. 3. The hypervisor reads the guest instruction that caused the protection fault, 451, i.e. the instruction that attempted to fetch the replay variable, and determines that this instruction is the start of a replay-time-only functionality, 452. The hypervisor then pauses replay, 453, saves the state of the VM, 454, and ensures that the fetch of the replay variable returns a value of one to cause the guest software to execute the replay-time-only core functionality, 455. Execution now resumes in the guest software in the method of FIG. 4. Because the fetch of the replay variable returns a value of one, the guest software determines that the VM is in replay mode, 502, and executes the replay-time-only core functionality, 504.

Next, the guest software determines whether replay of the VM should be stopped, 505, based on the replay-time-only core functionality and/or based on user input. If a determination is made that the VM should go live, a hypercall to go live is made, 506. Otherwise, a hypercall to resume replay is made, 507. In either case, the hypervisor is activated by the respective hypercall to resume the method of FIG. 3. The hypervisor reads the next guest instruction, 451, and, this time, the hypervisor determines that the guest instruction is not the start of a replay-time-only functionality, 452. Next, if the next guest instruction is a hypercall to resume replay, 456, then the hypervisor restores the VM to a previously saved state, 457, such as the state previously saved at step 454, and resumes replay of the VM, 458, before returning execution to the guest software. If the next instruction is not a hypercall to resume replay, 456, then the hypervisor determines whether the next instruction is a hypercall to go live, 459. If not, then the hypervisor executes the instruction normally and generally returns execution to the guest software. If the next instruction is a hypercall to go live, 459, then the hypervisor terminates replay mode and causes the VM to go live, 460. Among other things, the hypervisor will cause a fetch to the replay variable to again return a value of zero, without invoking the hypervisor, such as by writing a zero to the replay variable and by turning off page protection for the memory page containing the replay variable. Next, the replay mode ends at step 461. Once execution returns to the guest software after either a hypercall to go live, 506, or a hypercall to resume replay, 507, the replay-time-only functionality ends at step 503.

An embodiment of the present invention can be implemented using an API that can permit a user (such as a developer) to insert replay-time-only code into applications to help investigate the behavior of an application running on a virtual machine, after the application has run. Replay-time-only-assertions included in the API incur relatively little performance overhead at run time. After recording a VM session, the user can replay selected portions while performing data consistency checks and logging. If an application is failing, replay-time-only-assertion statements can be added, the application can be recompiled, run and recorded to the failure point. It can then be replayed with checking enabled to diagnose the problem.

Replay-time-only-assertions can use the record and replay facility developed for VMware Workstation 6. Workstation 6.5 supports the insertion of markers while recording and replaying a session so that a user can quickly navigate to these markers during replay. It is also possible to browse through a recording and choose the starting event for replay. Workstation 6.5 also supports inserting program statements that initialize the replay-time-only-assertions in the API, perform consistency checks and log messages to a file, all at replay time only. The performance penalty of using the API is encountered almost entirely at replay time.

The following scenario is an example that shows some of the useful features in accordance with the replay-time-only-assertion API embodiment of the present invention. A customer reports that an application fails, but only after an extended period of heavy use. The application developer is unable to reproduce the failure on the development system. The developer adds replay-time-only-assertion checking and logging statements to the application, recompiles the application and delivers it to the customer for testing on a VM. The customer begins recording to capture a period of heavy use. Because of the replay-time-only properties of embodiments of the present invention described above, the use of the replay-time-only assertions provided by the API imposes relatively little performance penalty during run time. The application fails and the customer quickly restarts it to avoid any prolonged interruption in service. Recording is turned off. The recording is sent to the developer, who enables replay-time-only-assertion checking and logging on replay, which enables the developer to diagnose the problem.

Those of skill in the art will appreciate that the present invention is not limited to the embodiments discussed herein. Rather, the foregoing illustrates and does not limit the scope of the claimed invention. It will be clear that the claims encompass other embodiments within the scope and spirit of this disclosure.

What is claimed is:

1. A method for implementing replay-time-only functionalities in a virtual machine of a virtualized computer system, the virtual machine supporting the execution of guest software, the method comprising:
    determining if the virtual machine is in a replay mode;
    determining if a functionality included in a computer program in the guest software is a replay-time-only functionality, the computer program including at least a replay-time-only functionality and a functionality that is not a replay-time-only functionality;
    if the virtual machine is determined to be in the replay mode and if the functionality included in the computer program in the guest software is determined to be a replay-time-only functionality, then sequentially performing the following sequence of steps:
        pausing the replaying of the virtual machine;
        saving state information of the virtual machine;
        executing a core functionality of the replay-time-only functionality;
        restoring the virtual machine to a state that existed prior to the execution of the core functionality of the replay-time-only functionality; and
        resuming the replaying of the virtual machine.

2. The method of claim 1, further comprising skipping the execution of the core functionality of the replay-time-only functionality if the virtual machine is determined not to be in the replay mode.

3. The method of claim 1, wherein determining if the functionality included in the computer program in the guest software is a replay-time-only functionality comprises determining if a set of one or more instructions in the replay-time-only functionality matches a predetermined pattern.

4. The method of claim 1, wherein determining if the virtual machine is in the replay mode comprises reading a value stored in memory that cannot be modified by a guest operating system or a guest application and determining if the virtual machine is in the replay mode based upon the value.

5. The method of claim 4, wherein virtualization software sets the value stored in memory so as to cause the guest software to execute the core functionality of the replay-time-only functionality.

6. The method of claim 5, wherein the virtualization software comprises a hypervisor.

7. The method of claim 1, wherein saving the state information of the virtual machine comprises saving central processing unit (CPU) state information and memory state information of the virtual machine to protected memory.

8. The method of claim 1, wherein executing the core functionality of the replay-time-only functionality comprises saving data to protected memory and making the saved data accessible to subsequent replay-time-only functionalities.

9. The method of claim 8, wherein the data is accessible to the subsequent replay-time-only functionalities after the restoring of the virtual machine state.

10. The method of claim 1, wherein the core functionality of the replay-time-only functionality is an assertion.

11. The method of claim 1, further comprising logging output of the execution of the core functionality of the replay-time-only functionality outside of the virtual machine whose execution is being replayed.

12. The method of claim 1, wherein restoring the virtual machine to a state that existed prior to the execution of the core functionality of the replay-time-only functionality comprises restoring the virtual machine to a state that existed before or at the time at which the state information of the virtual machine was saved.

13. The method of claim 1, wherein executing the core functionality of the replay-time-only functionality comprises terminating the replay mode of the virtual machine based upon at least one instruction contained in the core functionality of the replay-time-only functionality.

14. The method of claim 1, wherein executing the core functionality of the replay-time-only functionality comprises terminating the replay mode of the virtual machine based upon user input.

15. The method of claim 1, wherein the execution of the core functionality of the replay-time-only functionality is terminated if a predetermined period of time has elapsed.

16. The method of claim 1, wherein resuming the replaying of the virtual machine is responsive to receiving a hypercall from the guest software.

17. A method for implementing replay-time-only functionalities in a virtualized computer system, the virtualized computer system comprising virtualization software supporting the execution of a virtual machine including guest software, the method comprising:
    during the execution of the guest software, the guest software encountering a replay-time-only functionality in a computer program executing within the virtual machine, the computer program including at least a replay-time-only functionality and a functionality that is not a replay-time-only functionality;
    during the execution of the guest software, the guest software determining if the virtual machine is in a replay mode based on information provided, at least in part, by the virtualization software in the virtualized computer system;
    if the virtual machine is determined to be in the replay mode by the guest software, the guest software executing a core functionality of the replay-time-only functionality; and
    if the virtual machine is determined not to be in the replay mode by the guest software, the guest software proceeding past the replay-time-only functionality in the computer program without executing the core functionality of the replay-time-only functionality.

18. The method of claim 17, further comprising, if the virtual machine is determined to be in the replay mode, the guest software determining whether to terminate the replay mode based upon the execution of the core functionality of the replay-time-only functionality, and if it is determined to terminate the replay mode, the guest software terminating the replay mode by making a hypercall to the virtualization software to terminate the replay mode.

19. The method of claim 18, wherein the guest software determining whether to terminate the replay mode is further based upon user input.

20. The method of claim 18, further comprising, if it is determined not to terminate the replay mode, the guest software resuming the replay mode by making a hypercall to the virtualization software to resume the replay mode.

21. The method of claim 17, wherein the guest software determining if the virtual machine is in the replay mode comprises the guest software reading a value stored in memory and determining if a functionality is a replay-time-only functionality based upon the value.

22. The method of claim 17, wherein the guest software executing the core functionality of the replay-time-only functionality comprises the guest software saving data to protected memory, the method further comprising the guest software accessing the saved data on a subsequent replay-time-only functionality.

23. The method of claim 17, wherein execution of the core functionality of the replay-time-only functionality is terminated at the expiration of a predetermined period of time.

24. A method for implementing replay-time-only functionalities in a virtualized computer system, the method being performed by virtualization software in support of a virtual machine in the virtualized computer system, the virtual machine supporting the execution of guest software, the method being performed when the virtual machine is in a replay mode, the method comprising:
    during the execution of the guest software, determining if the guest software has encountered a replay-time-only functionality in a computer program executing within the virtual machine, the computer program including at least a replay-time-only functionality and a functionality that is not a replay-time-only functionality, and, if it is determined that the guest software has encountered a replay-time-only functionality, then sequentially performing the following sequence of steps:
        pausing the replaying of the virtual machine;
        saving state information of the virtual machine;
        causing the guest software to execute a core functionality of the replay-time-only functionality; and
        determining if the guest software has completed executing the core functionality of the replay-time-only functionality, and, if the guest software has completed executing the core functionality of the replay-time-only functionality, then sequentially performing the following sequence of steps:
            restoring the virtual machine to a state that existed prior to the execution of the core functionality of the replay-time-only functionality; and
            resuming the replaying of the virtual machine.

25. The method of claim 24, wherein the virtualization software is a hypervisor.

26. The method of claim 24, wherein determining if the guest software has completed executing the core functionality of the replay-time-only functionality comprises receiving a hypercall from the guest software to resume replay of the virtual machine.

27. The method of claim 26, further comprising terminating the replaying of the virtual machine in response to the guest software issuing a hypercall to terminate the replaying of the virtual machine.

28. The method of claim 24, wherein determining if the guest software has encountered a replay-time-only functionality comprises determining if a set of one or more instructions in the replay-time-only functionality matches a predetermined pattern.

29. The method of claim 24, wherein determining if the guest software has encountered a replay-time-only functionality comprises detecting an attempted access by the guest software to a replay variable.

30. The method of claim 29, wherein the virtualization software uses memory protection to protect a memory page containing the replay variable.

31. The method of claim 29, wherein the virtualization software sets the replay variable to a value that causes the guest software to execute the core functionality of the replay-time-only functionality when the virtual machine is in the replay mode.

32. The method of claim 24, wherein the execution of the core functionality of the replay-time-only core functionality comprises saving data to protected memory, the method further comprising making the saved data accessible to subsequent replay-time-only functionalities.

33. The method of claim 24, further comprising logging output of the execution of the core functionality of the replay-time-only functionality outside of the virtual machine whose execution is being replayed.

34. A set of computer instructions stored in a non-transitory computer-readable medium, the set of computer instructions implementing a method for implementing replay-time-only functionalities in a virtual machine of a virtualized computer system, the virtual machine supporting the execution of guest software, the method comprising:
    determining if the virtual machine is in a replay mode;
    determining if a functionality included in a computer program in the guest software is a replay-time-only functionality, the computer program including at least a replay-time-only functionality and a functionality that is not a replay-time-only functionality;
if the virtual machine is determined to be in the replay mode and if the functionality included in the computer program in the guest software is determined to be a replay-time-only functionality, then sequentially performing the following sequence of steps:
pausing the replaying of the virtual machine;
saving state information of the virtual machine;
executing a core functionality of the replay-time-only functionality;
restoring the virtual machine to a state that existed prior to the execution of the core functionality of the replay-time-only functionality; and
resuming the replaying of the virtual machine.

35. The set of computer instructions of claim 34, the method further comprising skipping the execution of the core functionality of the replay-time-only functionality if the virtual machine is determined not to be in the replay mode.

36. The set of computer instructions of claim 34, wherein determining if the functionality included in the computer program in the guest software is a replay-time-only functionality comprises determining if a set of one or more instructions in the replay-time-only functionality matches a predetermined pattern.

37. The set of computer instructions of claim 34, wherein determining if the virtual machine is in the replay mode comprises reading a value stored in memory that cannot be modified by a guest operating system or a guest application and determining if the virtual machine is in the replay mode based upon the value.

38. The set of computer instructions of claim 37, wherein virtualization software sets the value stored in memory so as to cause the guest software to execute the core functionality of the replay-time-only functionality.

39. The set of computer instructions of claim 34, wherein executing the core functionality of the replay-time-only functionality comprises saving data to protected memory and making the saved data accessible to subsequent replay-time-only functionalities.

40. The set of computer instructions of claim 34, further comprising logging output of the execution of the core functionality of the replay-time-only functionality outside of the virtual machine whose execution is being replayed.

41. The set of computer instructions of claim 34, wherein executing the core functionality of the replay-time-only core functionality comprises terminating the replay mode of the virtual machine based upon at least one instruction contained in the core functionality of the replay-time-only functionality.

42. The set of computer instructions of claim 34, wherein executing the core functionality of the replay-time-only functionality comprises terminating the replay mode of the virtual machine based upon user input.

43. The set of computer instructions of claim 34, wherein resuming the replaying of the virtual machine is responsive to receiving a hypercall from the guest software.

44. A set of computer instructions stored in a non-transitory computer-readable medium, the set of computer instructions implementing a method for implementing replay-time-only functionalities in a virtualized computer system, the virtualized computer system comprising virtualization software supporting the execution of a virtual machine including guest software, the method comprising:
during the execution of the guest software, the guest software encountering a replay-time-only functionality in a computer program executing within the virtual machine, the computer program including at least a replay-time-only functionality and a functionality that is not a replay-time-only functionality;
during the execution of the guest software, the guest software determining if the virtual machine is in a replay mode based on information provided, at least in part, by the virtualization software in the virtualized computer system;
if the virtual machine is determined to be in the replay mode by the guest software, the guest software executing a core functionality of the replay-time-only functionality; and
if the virtual machine is determined not to be in the replay mode by the guest software, the guest software proceeding past the replay-time-only functionality in the computer program without executing the core functionality of the replay-time-only functionality.

45. The set of computer instructions of claim 44, further comprising, if the virtual machine is determined to be in the replay mode, the guest software determining whether to terminate the replay mode based upon the execution of the core functionality of the replay-time-only functionality, and if it is determined to terminate the replay mode, the guest software terminating the replay mode by making a hypercall to the virtualization software to terminate the replay mode.

46. The set of computer instructions of claim 45, wherein the guest software determining whether to terminate the replay mode is further based upon user input.

47. The set of computer instructions of claim 45, further comprising, if it is determined not to terminate the replay mode, the guest software resuming the replay mode by making a hypercall to the virtualization software to resume the replay mode.

48. The set of computer instructions of claim 44, wherein the guest software determining if the virtual machine is in the replay mode comprises the guest software reading a value stored in memory and determining if a functionality is a replay-time-only functionality based upon the value.

49. The set of computer instructions of claim 44, wherein the guest software executing the core functionality of the replay-time-only functionality comprises the guest software saving data to protected memory, the method further comprising the guest software accessing the saved data on a subsequent replay-time-only functionality.

50. The set of computer instructions of claim 44, wherein execution of the core functionality of the replay-time-only functionality is terminated at the expiration of a predetermined period of time.

51. A set of computer instructions stored in a non-transitory computer-readable medium, the set of computer instructions implementing a method for implementing replay-time-only functionalities in a virtualized computer system, the method being performed by virtualization software in support of a virtual machine in the virtualized computer system, the virtual machine supporting the execution of guest software, the method being performed when the virtual machine is in a replay mode, the method comprising:
during the execution of the guest software, determining if the guest software has encountered a replay-time-only functionality in a computer program executing within the virtual machine, the computer program including at least a replay-time-only functionality and a functionality that is not a replay-time-only functionality, and, if it is determined that the guest software has encountered a replay-time-only functionality, then sequentially performing the following sequence of steps:

pausing the replaying of the virtual machine;
saving state information of the virtual machine;
causing the guest software to execute a core functionality of the replay-time-only functionality; and
determining if the guest software has completed executing the core functionality of the replay-time-only functionality, and, if the guest software has completed executing the core functionality of the replay-time-only functionality, then sequentially performing the following sequence of steps:
restoring the virtual machine to a state that existed prior to the execution of the core functionality of the replay-time-only functionality; and
resuming the replaying of the virtual machine.

52. The set of computer instructions of claim 51, wherein the virtualization software is a hypervisor.

53. The set of computer instructions of claim 51, wherein determining if the guest software has completed executing the core functionality of the replay-time-only functionality comprises receiving a hypercall from the guest software to resume replay of the virtual machine.

54. The set of computer instructions of claim 53, further comprising terminating the replaying of the virtual machine in response to the guest software issuing a hypercall to terminate the replaying of the virtual machine.

55. The set of computer instructions of claim 51, wherein determining if the guest software has encountered a replay-time-only functionality comprises detecting an attempted access by the guest software to a replay variable.

56. The set of computer instructions of claim 55, wherein the virtualization software uses memory protection to protect a memory page containing the replay variable.

57. The set of computer instructions of claim 55, wherein the virtualization software sets the replay variable to a value that causes the guest software to execute the core functionality of the replay-time-only functionality when the virtual machine is in the replay mode.

58. The set of computer instructions of claim 51, wherein the execution of the core functionality of the replay-time-only functionality comprises saving data to protected memory, the method further comprising making the saved data accessible to subsequent replay-time-only functionalities.

59. The set of computer instructions of claim 51, further comprising logging output of the execution of the core functionality of the replay-time-only functionality outside of the virtual machine whose execution is being replayed.

* * * * *